United States Patent [19]
Sabanci

[11] 3,869,642
[45] Mar. 4, 1975

[54] CONTROL CIRCUIT FOR ELECTRONIC FLASH APPARATUS
[75] Inventor: Mehmet Sabanci, Braunschweig, Germany
[73] Assignee: Rollei-Werke Frahke & Heidecke, Braunschweig, Germany
[22] Filed: Mar. 27, 1974
[21] Appl. No.: 455,134

[30] Foreign Application Priority Data
Apr. 4, 1973   Germany............................ 2316724

[52] U.S. Cl............. 315/151, 315/159, 315/241 P, 315/242
[51] Int. Cl. .......................................... H05b 37/02
[58] Field of Search .... 315/151, 159, 241 R, 241 P, 315/242

[56] References Cited
UNITED STATES PATENTS
3,809,954   5/1974   Engelstatter.................... 315/241 P Primary Examiner—James B. Mullins
Attorney, Agent, or Firm—Stonebraker & Shepard

[57] ABSTRACT

Electronic flash apparatus for photographic purposes, of the type in which light sensitive integrating means receives light reflected from the subject being photographed, and terminates the flash when the reflected light reaches a threshold value. A special circuit is provided for greatly increasing the speed of response to the reflected light, thus enabling the production of a flash of extremely short duration as required in close-up photography. This avoids the overexposure which often occurs with conventional electronic flash apparatus when taking close-up photographs. The control circuit includes a capacitor, a resistor, and an inductance, so dimensioned that the time constant formed from the resistor and the capacitor is equal to the time constant formed by the resistor and the inductance. This enables the response time of the control circuit to be measured in nanoseconds rather than in microseconds.

5 Claims, 1 Drawing Figure

PATENTED MAR 4 1975 3,869,642
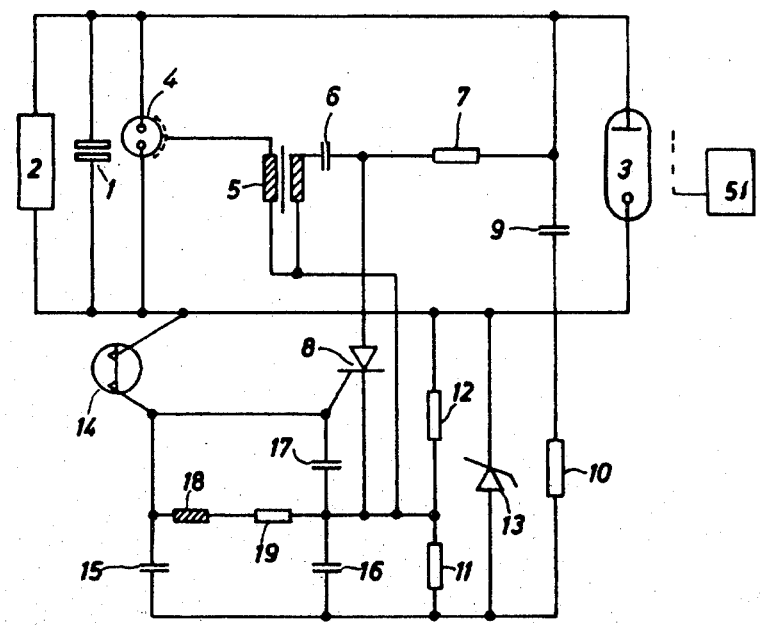

CONTROL CIRCUIT FOR ELECTRONIC FLASH APPARATUS

BACKGROUND OF THE INVENTION

Electronic flash apparatus, for illuminating an object to be photographed, is well known in the art. In certain types of such apparatus, the flash is of constant duration. In another type of such apparatus, the flash is terminated at a variable time, depending upon the integrated value of the light reflected from the object being photographed and falling upon a light sensitive element of the integrating means. It is to this second type that the present invention relates.

In prior art flash apparatus of this second type, often called computing flash units, there is a tendency to produce too much light, resulting in overexposure, when taking close-up photographs even though the apparatus may give correct exposure when the photograph is taken at a greater distance. This is because, at very small distances, the light produced by the flash tube and falling upon the object is very intense, and therefore the flash should last for only an extremely short time interval. Many of the prior art flash units of the computing type are simply unable to respond quickly enough to the reflected light, in order to give a flash of a sufficiently short duration, although they respond adequately when the object being photographed is farther from the camera, so that a longer flash is required and does not cause overexposure of the film.

In the prior art it is known to use a thyristor as part of the control circuit for terminating the flash, and to use a capacitor connected in parallel with the ignition path (cathode circuit) of the thyristor. In known control circuits of this kind, the flash reflected from the object being photographed falls upon a flash light measuring device comprising a photosensitive element and an integrating capacitor. In the photosensitive element, current is generated, the intensity of this generated current depending upon the intensity of the light flux falling on the photo-sensitive element (by reflection from the object being photographed), and this charges up the integrating capacitor. The latter is connected with the control grid or gate of the thyristor, which is actuated by the grid to make the thyristor conductive as soon as the capacitor voltage has exceeded a certain threshold value. The flash light discharge is consequently interrupted. To help in avoiding faulty control operations such as are likely to occur particularly when the photosensitive element is positioned in the immediate vicinity of the flash light reflector, another capacitor sometimes called an interference capacitor is connected in parallel with the ignition path of the thyristor, that is, in parallel with the conductor leading from the cathode of the thyristor.

Control circuits constructed in this manner operates satisfactorily only when the camera or the photosensitive element connected with it is farther away from the object being photographed than a certain minimum distance. This is due to the fact that the response time of the apparatus, determined by the response speed of the electronic flash light measuring and flash limiting circuit, is of approximately the same order of magnitude as the time required from the moment of emission of the flash to arrival on the photosensitive element. Owing to its inertia, therefore, the control circuit terminates the flash much later than is required for correct exposure of the photographic film. This leads, particularly in the close-up range, to serious overexposure.

Attempts have been made to shorten the response time, but the attempts according to the prior art have not been entirely successful.

The purpose of the present invention is to reduce the response time of the electronic control circuit to such an extent that a minimum distance need no longer be maintained between the camera and the object being photographed, in order to insure satisfactory operation of the flash apparatus, so that the flash apparatus always emits the correct quantity of light, regardless of the distance.

SUMMARY OF THE INVENTION

The invention enables this object to be achieved as a result of the fact that a resistor and an inductance are connected in series with each other and in parallel with the capacitor which is connected in parallel with the ignition section of the thyristor. The resistor, capacitor, and inductance are so dimensioned that the time constants formed from the resistor and the capacitor are equal to the time constants formed from the resistor and the inductance. This insures that the response time of the control circuit is greatly reduced, being now measured in nanoseconds instead of in microseconds.

BRIEF DESCRIPTION OF THE DRAWING

The single view is a schematic wiring diagram of flash apparatus in accordance with in invention.

DESCRIPTION OF THE PREFERRED EMBODIMENT

Referring now to the schematic wiring diagram, the electronic flash apparatus comprises a main storage capacitor 1 charged up to operating voltage by any suitable direct current supply indicated schematically at 2. This supply may be a battery, or a direct current converter or a voltage doubling device, or any suitable direct current supply of known form, the details of which are not important for purposes of the present invention. The flash tube 3, and a quenching tube 4 which interrupts the flash discharge, are connected in parallel with the storage capacitor 1. The flash tube is ignited by an ignition device 51 of known form which is set in operation by the closing of the conventional synchronous contacts of the camera, operating in synchronism with the camera shutter, in the usual conventional manner.

The quenching tube 4 can be ignited by means of an ignition transformer 5, the primary winding of which is situated in the discharge circuit of a capacitor 6. This capacitor is charged up to operating voltage, together with the main capacitor 1, via a resistor 7. The capacitor 6 can be discharged through the primary winding of the transformer 5, when the thyristor 8 becomes conductive and is driven hard.

For the supply of voltage to the control circuit, there is a series connection comprising a further capacitor 9, a resistor 10, and a voltage divider circuit made up of the resistors 11 and 12, this series circuit (9, 10, 11, 12) being connected in parallel with the storage capacitor 1 and the tubes 3 and 4. A Zener diode 13 is connected in parallel with the voltage divider circuit 11, 12 in such a way that it is operated in the disruptive discharge direction when the capacitor 9 is discharged.

There is another series circuit comprising a phototransistor 14 and an integrating capacitor 15, this series circuit being connected in parallel with the voltage divider circuit 11, 12. The control grid of the thyristor 8 is connected to a point between the capacitor 15 and the emitter of the transistor 14. The anode-cathode circuit of the thyristor 8 is in the ignition circuit of the quenching tube 4, is parallel with the capacitor 6 and the ignition transformer 5. The cathode of the thyristor 8 is also connected with the central tap of the voltage divider circuit, that is, connected to a point between the resistors 11 and 12. A further capacitor 16 is connected in parallel with the resistor 11, as illustrated.

In parallel with the ignition path of the thyristor 8, there are connected an interference capacitor 17 on the one hand, and a series circuit comprising the inductance or choke 18 and a resistor 19, on the other hand. These elements 17, 18, and 19 are so dimensioned that the time constants formed from the ohmic resistor 19 and the capacitor 17 are equal to the time constants formed from the ohmic resistor 19 and the inductance or choke 18.

The operation of the control circuit is as follows:

The capacitors 1, 6, and 9 are charged up to operating voltage from the current supply source 2. After the ignition of the flash tube 3 by operation of the ignition device 51, the charge on the storage capacitor 1 can discharge through the flash tube 3. Similarly, the capacitor 9 discharges through the flash tube 3, the voltage divider circuit 11, 12, and the resistor 10. The voltage divider circuit thus becomes subject to a voltage which is kept constant by the Zener diode 13, and which represents the supply voltage for the control circuit.

The voltage drop occurring in the resistor 11 determines the cathode potential of the thyristor 8. Owing to the capacitor 16 connected in parallel, the voltage in the resistor 11 increases from zero point, at the moment of the ignition of the flash tube, with a time constant determined by the resistance of the resistor 12 and the capacitance of the capacitor 16.

The light emitted by the flash tube 3 is reflected from the object or subject being photographed, and falls upon the phototransistor 14. The intensity of the current flowing in the collector-emitter circuit of the phototransistor 14 depends on the intensity of the light reflected from the object. The capacitor 15 and also the capacitor 17 are charged up. When the potential in the control grid of the thryistor 8 exceeds the cathode potential of the thyristor to the extent of the ignition voltage of the thyristor, then the thyristor becomes conductive, and the capacitor 6 discharges through the thyristor and the primary winding of the ignition transformer 5, producing in the latter a voltage impulse which is transformed into the secondary winding of the transformer and which, through the ignition electrode of the tube 4, causes the quenching tube 4 to ignite.

As the internal resistance of the quenching tube 4 is much less than that of the flash tube 3, the quenching tube takes over the further discharge of the capacitor 1, so that current no longer flows through the flash tube 3, and emission of light from the flash tube is terminated.

This arrangement, and the dimensions of the control elements 17, 18, and 19 as above explained, have the favorable result that the response time of the control circuit is considerably reduced as compared with prior art control circuits. Thus the camera and the photosensitive element 14 connected with it can now be taken as near as desired to the object or subject being photographed, with assurance that the response of the control circuit (in stopping emission of light from the flash tube) will be sufficiently fast to avoid incorrect overexposure of the photographic film, even though the flash must be of extremely short duration because of closeness to the object.

What is claimed is:

1. Electronic flash apparatus for photographic illumination comprising flash producing means, flash terminating means including a thyristor effective, upon actuation, to terminate a flash produced by said producing means, said thyristor having a control grid, flash measuring means for measuring an integrated amount of light reflected from an object being photographed, and control circuit means responsive to said measuring means for actuating said thyristor to teminate said flash when the integrated amount of light measured by said measuring means reaches a threshold value, said control circuit means including a capacitor (17) connected to said control grid, and an inductance (18) and a resistor (19) connected in series with each other and in parallel with said capacitor (17), said capacitor, inductance, and resistance being so dimensioned that the time constant resulting from the dimensions of said capacitor and resistor is substantially equal to the time constant resulting from the dimensions of said inductance and resistor.

2. Flash apparatus as defined in claim 1, wherein said flash producing means comprises a flash tube, and wherein said thyristor has an anode and a cathode, further comprising a series circuit having a capacitor, a resistor, and a voltage divider in series with each other, said series circuit being connected in parallel with said flash tube, said cathode of said thyristor being connected to an intermediate tap of said voltage divider.

3. Flash apparatus as defined in claim 2, further comprising a Zener diode connected in parallel with said voltage divider.

4. Flash apparatus as defined in claim 2, wherein said measuring means comprises a photo transistor having an emitter, said emitter being connected to said control grid of said thyristor.

5. Flash apparatus as defined in claim 2, wherein said terminating means comprises a quench tube 4 having an ignition electrode, a transformer (5) having a secondary winding connected to said ignition electrode and also having a primary winding, and a termination capacitor (6) connected to said primary winding and to the anode of said thyristor in such manner that when said thyristor becomes conductive, said termination capacitor (6) may discharge through said primary winding to create a pulse in said secondary winding and said ignition electrode to ignite said quench tube.

* * * * *